No. 627,930.  
E. F. FROST.  
KINETOSCOPE.  
(Application filed Apr. 22, 1899.)  
Patented June 27, 1899.

(No Model.)

Witnesses:  
T. L. Mockabee  
H. R. Croghan

Inventor  
Ellis F. Frost

UNITED STATES PATENT OFFICE.

ELLIS F. FROST, OF WASHINGTON, DISTRICT OF COLUMBIA.

KINETOSCOPE.

SPECIFICATION forming part of Letters Patent No. 627,930, dated June 27, 1899.

Application filed April 22, 1899. Serial No. 714,145. (No model.)

*To all whom it may concern:*

Be it known that I, ELLIS F. FROST, a citizen of the United States, residing at Washington, in the District of Columbia, have invented certain new and useful Improvements in Kinetoscopes; and I do hereby declare the following to be a full, clear, and exact description of the invention, such as will enable others skilled in the art to which it appertains to make and use the same.

My invention relates to coin-controlled kinetoscopes, particularly to kinetoscopes involving the use of a moving mirror for viewing the kinetoscopic picture-belt.

The object of my invention is to alternately permit and prevent, by means of a coin-controlled mechanism, a mirror from exhibiting a kinetoscopic view of a kinetoscopic picture-belt.

My invention consists in the combination, with a mirror and a kinetoscopic picture-belt, of coin-controlled mechanism designed to control the use of the mirror for viewing the kinetoscopic picture-belt.

The apparatus designed to control the use of the mirror for viewing the kinetoscopic belt is as described below, reference being made to the accompanying drawings, in the various figures of which like numbers refer to like parts.

Figure 3:
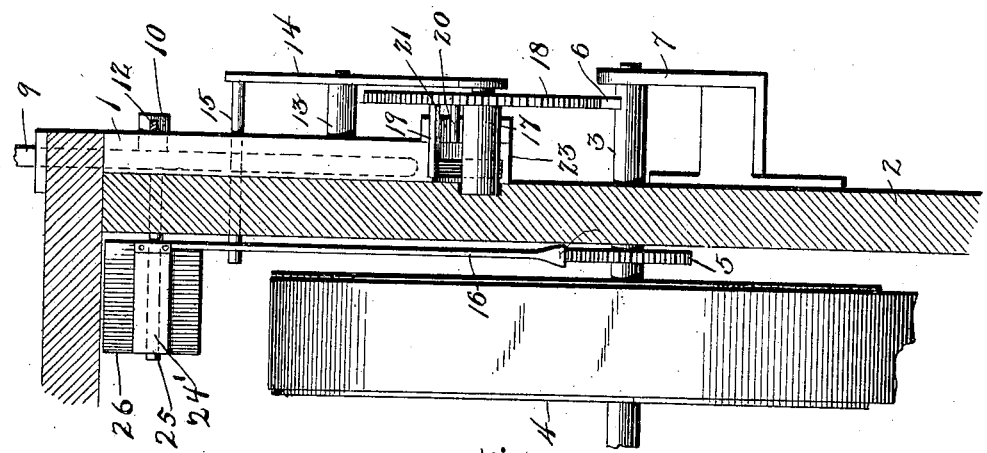
Figures 1, 2:
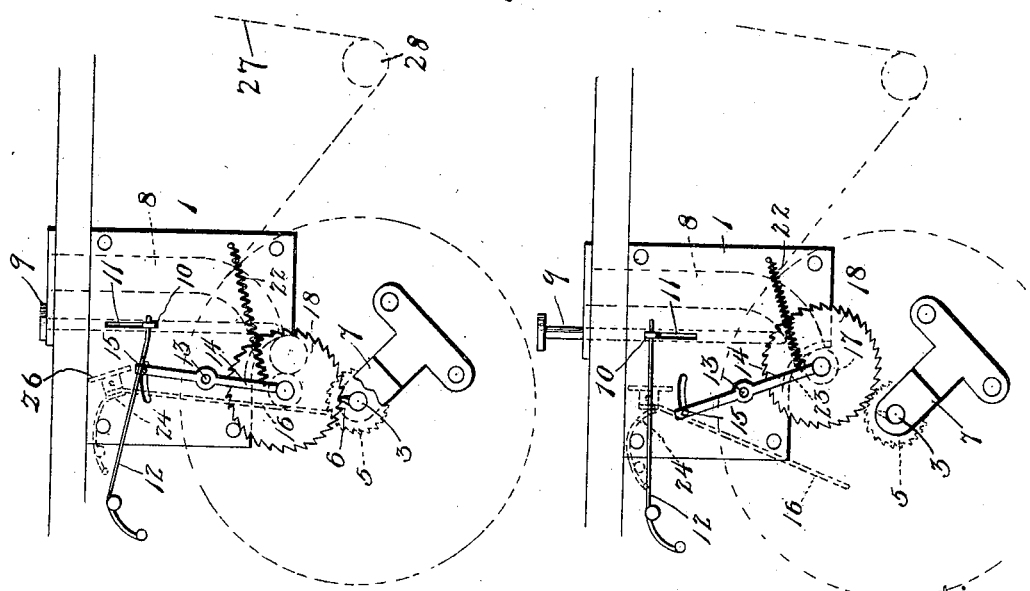

In the drawings, Figure 1 is a view in elevation of the mechanism in operative position by reason of a coin to permit the use of the mirror for viewing the kinetoscopic picture-belt. Fig. 2 is a view in elevation of the mechanism in inoperative position by reason of the absence of a coin to prevent the use of the mirror for viewing the kinetoscopic picture-belt. Fig. 3 is an enlarged vertical section.

In the figures the base-plate 1 is fastened to the wall 2 on the side opposite to the kinetoscopic mechanism. The shaft 3, to which the driving power is applied, as by means of a crank, extends through the wall 2 and carries on one side the belt-carrying wheel 4 and the mirror-arm ratchet 5 and on the other side a tooth 6 and finds a bearing in the bracket 7. The bracket 7 is fastened to the wall 2.

The kinetoscopic mechanism proper consists of the crank and shaft 3, the belt-carrying wheel 4, and the mirror-arm ratchet 5, mounted on the shaft 3, the mirror-arm 16, which is fixed to the mirror-mounting block 24', the mirror-post 25, the mirror 26, and belt-roller 28. The mirror-block is pivotally mounted on the stub or post 25 and carries the mirror 26, the mirror-block 24' being in apposition to the non-reflecting surface of the mirror 26. The non-reflecting surface of the mirror is the surface shown in Fig. 3. The belt 27 is so placed that it can be viewed in the reflecting-surface of the mirror 26.

Inasmuch as the belt travels continuously, in order to exhibit the pictures on the belt kinetoscopically it is desirable to give the pictures seeming rest for a time. This is accomplished by giving the mirror such a relative movement to that of the belt as will hold each of the rays of light from the moving pictures stationary through a given point. The light-rays from the moving pictures are held stationary through a given point because when the crank is turned the belt is moved by the belt-wheel 4, and at the same time the mirror-arm ratchet 5 pushes the mirror-arm 16 forward, thus turning the mirror 26 about its axis of oscillation while the portion of the belt equal to the height of one picture is passing, when the mirror-arm 16 slips over the mirror-arm ratchet 5 to the next tooth almost instantly by reason of the action of the spring 24, to again follow the succeeding picture. Now anything which will interfere with the holding of each of the light-rays from a moving picture stationary through a given point will interfere with the kinetoscopic exhibition of the picture.

The plate 1 on the side next the wall 2 is recessed to form the coin-raceway 8 and the channel for the push-rod 9, the wall 2 serving to make these channels closed. A projection 10 on the push-rod 9 extends through a slot 11 in the base-plate 1 to engage with a spring 12, which serves to normally keep the push-rod 9 lifted. Also carried by the base-plate 1 is a boss 13, on which is pivotally mounted an arm 14. The arm 14 at its upper end carries a rod 15, which projects through an opening in the base-plate 1 and through the wall 2 in front of the mirror-arm 16. The arm 14 at its lower end carries an arbor 17, which projects from the arm 14 toward and into a recess in the wall 2 below the base-plate 1. On the arbor 17 is revolubly mounted a ratchet-wheel 18, which has projections 19 20, one extending to the wall 2 and the other to the level of the surface of the base-plate 1 away from the wall 2. A projection 21 on the base-plate 1 is designed for the projection 20 to slide upon during a portion of its path of travel. A spring 22 is attached to the arm 14 to draw the arbor 17 toward the end of the coin-raceway 8. A spring 24 tends to throw the mirror-arm 16 into the path of the mirror-arm ratchet 5.

The parts being assembled, the normal position of the machine is as in Fig. 2, in which the arbor 17 is drawn by the spring 22 against the end of the coin-raceway 8, the rod 15, carried by the arm 14, being held against the mirror-arm 16 and holding the mirror-arm 16 out of the path of the mirror-arm ratchet 5. If now the shaft 3 be turned, thus moving the kinetoscopic belt, because of the mirror being at rest no kinetoscopic view of the pictures can be seen in the mirror. If now a proper coin or its equivalent be dropped into the coin-raceway 8 it will fall to the bottom of the raceway 8 and be arrested from further travel by the arbor 17. The push-rod 9, being located above this position of the coin, if now pushed down will force the coin between the lower edge of the raceway 8 and arbor 17 by forcing the arbor 17 in a direction opposed to the tension of the spring 22 until the ratchet-teeth of the wheel 18 lie in the path of the tooth 6 on the driving-shaft 3. The position of the mechanism is now such that the rod 15 is carried away from the mirror-arm 16, thus allowing it to engage with the mirror-arm ratchet 5 and play freely thereon. If now the driving-shaft 3 be turned, thus moving the kinetoscopic picture-belt, the mirror can oscillate and a kinetoscopic view of the picture-belt be seen therein. At each revolution of the driving-shaft 3 the tooth 6 will engage with one ratchet-tooth of the wheel 18, and thus the wheel 18 will be turned one tooth and held in this position by reason of sufficient friction against the arbor or other suitable friction. After a sufficient number of revolutions of the driving-shaft 3 the projection 19, carried by the wheel 18, strikes the coin and after a little travel pushes the coin down from between the arbor 17 and the lower edge of the raceway 8; but the parts remain in the same position as before, because now held in this position by the projection 19 resting against the edge 23 of the base-plate 1, and when it is about to pass beyond the edge 23 the projection 20 presses against the projection 21, which is coincident with the edge 23. Finally after a number of turns of the driving-shaft 23 the projection 20 arrives at the end of the projection 21 and is pulled over the end of this projection by the spring 22, and thus the wheel 18 and its arbor 17 are drawn toward the normal position, the wheel 18 being now out of the path of the tooth 6 and the rod 15 on the arm 14 pressing the mirror-arm out of the path of the mirror-arm ratchet 5, so that now no kinetoscopic view of the picture-belt can be seen in the mirror.

It will be obvious from the foregoing that many changes, modifications, and variations of the structural features of my invention as described and illustrated may be effected without departing from the spirit of my invention, and I therefore reserve the right to make such changes as may come properly within the scope of the protection prayed.

What I claim is—

1. The combination with a kinetoscopic picture-belt and a mirror designed to kinetoscopically exhibit the same by reason of the mirror's oscillatory movement, of a coin-controlled mechanism for enabling said mechanism to alternately permit and prevent the kinetoscopic exhibition of said belt through the mirror.

2. The combination with a kinetoscopic picture-belt, a mirror for kinetoscopically exhibiting the same by reason of the mirror's oscillatory movement and a belt-carrying mechanism, of a coin-controlled mechanism and means for enabling a coin to throw the coin-controlled mechanism into operative relation with said belt-carrying mechanism.

3. The combination with a kinetoscopic picture-belt, a mirror for kinetoscopically exhibiting the same by reason of the mirror's oscillatory movement, a belt-carrying mechanism, a coin-controlled mechanism and means for enabling a coin to throw the coin-controlled mechanism into operative relation with said belt-carrying mechanism and to permit the kinetoscopic exhibition of said picture-belt in the mirror.

4. The combination with a kinetoscopic picture-belt, a mirror for kinetoscopically exhibiting the same by reason of the mirror's oscillatory movement, a belt-carrying mechanism and a coin-controlled mechanism, of means for enabling a coin to throw the coin-controlled mechanism into operative relation with said belt-carrying mechanism, and means for dislodging said coin.

5. The combination with a kinetoscopic picture-belt, a mirror for kinetoscopically exhibiting the same by reason of the mirror's oscillatory movement and a belt-carrying mechanism, of a coin-controlled mechanism and means for throwing the coin-controlled mechanism out of operation with the belt-carrying mechanism.

6. The combination with a kinetoscopic picture-belt, a mirror for kinetoscopically exhibiting the same by reason of the mirror's oscillatory movement, a belt-carrying mechanism and a coin-controlled mechanism, of means for throwing the coin-controlled mechanism out of operative relation with said belt-carrying mechanism and for preventing the kinetoscopic exhibition of the picture-belt in the mirror.

7. The combination with a kinetoscopic picture-belt, a mirror for kinetoscopically exhibiting the same by reason of the mirror's oscillatory movement, and a belt-carrying mechanism, of a coin-controlled mechanism operated by the shaft of the belt-carrying mechanism.

8. The combination with a moving belt and means for holding each light-ray therefrom stationary through a given point, of coin-controlled mechanism designed to interfere with or permit the holding of each light-ray from the moving belt stationary through a given point.

In testimony whereof I affix my signature in presence of two witnesses.

ELLIS F. FROST.

Witnesses:
JAS. H. BLACKWOOD,
LOUIS G. RANDALL.